United States Patent
Era et al.

(10) Patent No.: US 8,067,714 B2
(45) Date of Patent: Nov. 29, 2011

(54) SQUEEZING DETECTION CONTROL METHOD FOR CONSUMABLE ELECTRODE ARC WELDING

(75) Inventors: Tetsuo Era, Osaka (JP); Futoshi Nishisaka, Osaka (JP); Hiroyasu Mondori, Osaka (JP); Akihiro Ide, Osaka (JP)

(73) Assignee: DAIHEN Corporation, Osaka (JP)

( * ) Notice: Subject to any disclaimer, the term of this patent is extended or adjusted under 35 U.S.C. 154(b) by 920 days.

(21) Appl. No.: 12/072,964

(22) Filed: Feb. 29, 2008

(65) Prior Publication Data

US 2008/0223840 A1 Sep. 18, 2008

(30) Foreign Application Priority Data

Mar. 12, 2007 (JP) ................................. 2007-061369
Mar. 29, 2007 (JP) ................................. 2007-086277

(51) Int. Cl.
*B23K 9/10* (2006.01)
(52) U.S. Cl. ................................ 219/130.21; 219/130.5
(58) Field of Classification Search ............. 219/130.21, 219/130.31, 130.5, 130.51
See application file for complete search history.

(56) References Cited

U.S. PATENT DOCUMENTS

| | | | | |
|---|---|---|---|---|
| 4,371,776 A * | 2/1983 | Winn | ........................ | 219/130.51 |
| 4,877,941 A * | 10/1989 | Honma et al. | ........... | 219/130.21 |
| 6,833,529 B2 | 12/2004 | Ueyama et al. | | |
| 7,919,728 B2 * | 4/2011 | Era et al. | ................... | 219/130.21 |
| 2004/0060913 A1 * | 4/2004 | Ueyama et al. | .......... | 219/130.21 |
| 2008/0156781 A1 * | 7/2008 | Artelsmair et al. | ........ | 219/130.5 |

FOREIGN PATENT DOCUMENTS

| | | | |
|---|---|---|---|
| JP | 3173159 B2 * | 6/2001 | |
| JP | 2004-114088 | 4/2004 | |
| JP | 2006-281219 | 10/2006 | |
| JP | 2006281219 A * | 10/2006 | |
| WO | WO 2006089322 A1 * | 8/2006 | |

\* cited by examiner

*Primary Examiner* — Sang Paik
(74) *Attorney, Agent, or Firm* — Hamre, Schumann, Mueller & Larson, P.C.

(57) ABSTRACT

A squeezing detection control method is provided for consumable electrode arc welding. The method includes a step of detecting a droplet squeezing phenomenon by checking that a change in a voltage or resistance between the consumable electrode and base material reaches a squeezing detection reference value, and a step of executing output control for rapidly decreasing a welding current passing through a short-circuited load when the squeezing phenomenon is detected, so that arc re-striking occurs in a state of low current. The squeezing detection reference value is set to a first value during the electrode positive polarity, and set to a second value during the electrode negative polarity. The second value is different from the absolute value of the first value, and each of the first and second values is set such that the resultant welding state is satisfactory.

4 Claims, 8 Drawing Sheets

SQUEEZING DETECTION CONTROL METHOD FOR CONSUMABLE ELECTRODE ARC WELDING

BACKGROUND OF THE INVENTION

1. Field of the Invention

This invention relates to a squeezing detection control method for consumable electrode arc welding, to detect squeezing phenomena of droplets during short circuiting periods in consumable electrode arc welding, in order to sharply reduce the welding current and improve welding quality.

2. Description of the Related Art

FIG. 5 is a diagram showing current and voltage waveforms and droplet transfer in consumable electrode arc welding in which short circuiting periods Ts and arc periods Ta are repeated. In the figure, (A) indicates the change with time in the welding current Iw passing through the consumable electrode (hereafter called the welding wire 1), (B) indicates the change with time in the welding voltage Vw applied across the welding wire 1 and base material 2, and (C) through (E) indicate the manner of transfer of droplets 1a.

During the short circuit period Ts between times t1 and t3, a droplet 1a at the tip of the welding wire 1 is in a short circuiting state with the base material 2, and as shown in (A) in the figure, the welding current Iw gradually increases, so that as shown in (B) in the figure the welding voltage Vw assumes a low value of approximately several volts due to the short-circuited state. As shown in (C) in the figure, at time t1 the droplet 1a comes into contact with the base material 2 and enters a short circuiting state. Thereafter, as shown in (D) in the figure, squeezing 1b occurs in the upper portion of the droplet 1a due to the electromagnetic pinching force resulting from the welding current Iw passing through the droplet 1a. This squeezing 1b progresses rapidly, and as shown in (E) in the figure, at time t3 the droplet 1a is transferred from the welding wire 1 to the molten pool 2a, and the re-striking of an arc 3 occurs.

When the above squeezing phenomenon occurs, the short circuit is opened after an extremely short time on the order of several hundred μs, and an arc 3 re-strikes. That is, this squeezing phenomenon is a precursor of the opening of the short circuit. When squeezing 1b occurs, the conduction path of the welding current Iw becomes narrow at the squeezed portion, so that the resistance of the squeezed portion increases. The resistance increases as the squeezed portion becomes narrower with the progress of the squeezing. Hence by detecting a change in the resistance between the welding wire 1 and base material 2 during the short circuit period Ts, the occurrence and progress of the squeezing phenomenon can be detected. The change in resistance can be calculated by computing (welding voltage Vw)/(welding current Iw). Further, as explained above, the squeezing occurrence duration is an extremely short length of time, so that as shown in (A) in the figure, the change in welding current Iw during this period is small. Hence in place of a change in the resistance, occurrence of the squeezing phenomenon can also be detected through a change in the welding voltage Vw. One specific method of squeezing detection involves computing the rate of change (differential value) of the resistance or the welding voltage Vw during a short circuit period Ts, and detecting squeezing when this rate of change has reached a squeezing detection reference value determined in advance. Another method involves computing the voltage increase ΔV from the stable short circuit voltage Vs prior to the occurrence of squeezing during a short circuit period Ts, as in (B) in the figure, and detecting squeezing when at time t2 this voltage increase ΔV has reached a squeezing detection reference value Vtn determined in advance. In the following explanation, a case in which the above squeezing detection method employing the voltage increase ΔV is assumed; but various other methods proposed in the prior art may be used. The re-striking of an arc at time t3 can easily be detected by judging that the welding voltage Vw has become equal to or greater than a short circuit/arc discrimination value Vta. The period in which Vw<Vta is the short circuit period Ts, and the period in which Vw≧Vta is the arc period Ta. The time from detection of the occurrence of squeezing between times t2 and t3 and the time of re-striking of an arc will hereafter be called the squeezing detection period Tn. When at time t3 an arc re-strikes, the welding current Iw rises rapidly and then gently declines, as shown in (A) in the figure; and as indicated in (B), the welding voltage Vw becomes an arcing voltage of magnitude approximately several tens of volts. During the arc period Ta between times t3 and t4, the tip of the welding wire 1 is molten and a droplet 1a forms. Thereafter, the operation from time t1 to time t4 is repeated.

In the above-described welding accompanied by short circuiting, the current at time t3 when the arc 3 re-strikes can be a large current. In that (case, the arc force from the arc 3 toward the molten pool 2a rapidly increases, and massive sputtering occurs. That is, the amount of sputtering increases substantially in proportion to the current at arc re-striking Ia. Hence in order to suppress the occurrence of sputtering, this current at arc re-striking Ia must be kept small. As methods to accomplish this, various welding power supplies have been proposed in the prior art in which occurrence of the squeezing phenomenon is detected, and the welding current Iw is rapidly decreased to reduce the current at arc re-striking Ia. Below, this technology of the prior art is explained.

FIG. 6 is a block diagram of a welding power supply which adopts a squeezing detection control method of the prior art. The welding power supply PS is a welding power supply for use in general consumable electrode arc welding. The transistor TR is inserted in series with the output, and the resistor R is connected in parallel therewith. The voltage detection circuit VD detects the welding voltage Vw and outputs a voltage detection signal Vd. The squeezing detection circuit ND takes this voltage detection signal Vd as input, and outputs a squeezing detection signal Nd which is set to high level when in the short circuiting period Ts the above-described voltage increase ΔV reaches a squeezing detection reference value Vtn determined in advance, and which is set to low level when the voltage detection signal Vd reaches a short circuit/arcing discrimination value Vta determined in advance. That is, this squeezing detection signal Nd is at high level during the above-described squeezing detection period Tn. The driving circuit DR outputs a driving signal Dr which turns on the transistor TR when this squeezing detection signal Nd is at low level (when squeezing is not detected). Hence the transistor TR is in the off state when the squeezing detection signal Nd is at high level (when squeezing is detected).

FIG. 7 is a timing chart of the various signals in the above welding power supply. In the figure, (A) shows the welding current Iw, (B) shows the welding voltage Vw, (C) shows the squeezing detection signal Nd, and (D) shows the driving signal Dr.

In the figure, at the periods other than the squeezing detection period Tn from times t2 to t3, the squeezing detection signal Nd is at low level, as shown in (C); hence as indicated in (D), the driving signal Dr is at high level. As a result, the transistor TR is in the on state, so that operation is the same as that of a welding power supply for normal consumable electrode arc welding.

At time t2, when as shown in (B) in the figure the welding voltage Vw rises in the short circuiting period Ts and the voltage increase ΔV is detected as having become equal to or greater than a squeezing detection reference value Vtn determined in advance, so that droplet squeezing is judged to have occurred, the squeezing detection signal Nd goes to high level, as in (C) in the figure. In response to this, as shown in (D) in the figure, the driving signal Dr goes to low level, and so the transistor TR enters the off state. As a result, the resistor R is inserted into the conduction path of the welding current Iw. The value of this resistor R is set to a value ten times or more than the short circuit load (several tens of mΩ), so that as shown in (A) in the figure, the energy stored in the DC reactor within the welding power supply and the cable reactor is suddenly discharged, and the welding current Iw decreases rapidly. At time t3, when the short circuit is opened and arcing again occurs, the welding voltage Vw becomes equal to or greater than the short circuiting/arcing discrimination value Vta, determined in advance, as shown in (B). Upon detection of this, the squeezing detection signal Nd goes to low level, as shown in (C), and the driving signal Dr goes to high level, as shown in (D). As a result, the transistor TR enters the on state, and normal consumable electrode arc welding control is performed. By means of this operation, the arc re-striking current Ia at the time an arc re-strikes (at time t3) can be made small, and the occurrence of sputtering can be suppressed.

The above explanation is for the case of DC consumable electrode arc welding; but the case of consumable electrode arc welding accompanying short circuiting is similar. Below, a squeezing detection control method for consumable electrode arc welding is explained.

FIG. 8 is a current and voltage waveform diagram showing a squeezing detection, control method for consumable electrode arc welding. In the figure, (A) is a polarity-switching signal Spn, (B) is the welding current Iw, and (C) is the welding voltage Vw.

As shown in (A) in the figure, the polarity-switching signal Spn is at high level during an electrode positive polarity period Tep, determined in advance, and is at low level during an electrode negative polarity period Ten, determined in advance. The output polarity of the welding power supply is switched according to this polarity-switching signal Spn. In (B) and (C) in the figure, 0 A or 0 V and above indicate electrode positive polarity EP, and values below these indicate electrode negative polarity EN. Further, unless stipulated otherwise, the values of the welding current Iw and welding voltage Vw represent absolute values for both of the polarities.

When short circuiting occurs at time t1 during an electrode positive polarity period Tep, the welding current Iw increases, as shown in (B) in the figure, and as shown in (C), the welding voltage Vw becomes a low short circuit voltage value Vs of approximately several volts. When squeezing occurs at the droplet during the short circuit period Ts, the welding voltage Vw increases as shown in (C), and at time t2 the voltage increase ΔV reaches the squeezing detection reference value Vtn. In response, as shown in (B) in the figure, the welding current Iw falls rapidly. Then, at time t3 an arc re-strikes. The current Ia at the time of arc re-striking is low, so that there is extremely little occurrence of sputtering. During the arc period Ta, as shown in (B) in the figure, the welding current Iw rises rapidly and then falls gently, and as shown in (C), the welding voltage Vw assumes an arcing voltage value of several tens of volts. During the electrode positive polarity period Tep, the above operation is repeated. The electrode positive polarity period Tep is often set to approximately several hundred milliseconds, and so the number of short circuits during one period is approximately from several times to several tens of times.

At time t5, as shown in (A) in the figure, the polarity-switching signal Spn changes to low level, and the welding power supply output polarity switches to electrode negative polarity EN. At time t5, short circuiting occurs, and upon entering the short circuiting period Ts, the welding current Iw increases and the welding voltage Vw becomes the low short circuit voltage Vs, similarly to the above operation. Droplet squeezing occurs, and at time t6, when the voltage increase ΔV reaches the squeezing detection reference value Vtn as in (C), the welding current Iw drops rapidly, as shown in (B). Then, when arc re-strikes at time t7, the welding current Iw rises rapidly and then falls gradually as shown in (B), and as shown in (C), the welding voltage Vw assumes an arcing voltage value of several tens of volts. In this case also, the arc re-striking current Ia at time t7 is low, so that there is extremely little occurrence of sputtering. During the electrode negative polarity period Ten, the above operation is repeated. This electrode negative polarity period Ten is also set to approximately several hundred milliseconds, so that the number of short circuits in one period is, similarly to the above, from several times to several tens of times approximately.

As explained above, by performing squeezing detection control in consumable electrode arc welding also, the occurrence of sputtering can be greatly reduced, and high-quality welding becomes possible.

In the above-described squeezing detection control, the accurate detection of occurrence of the squeezing phenomenon is essential to greatly reduce sputtering and enable high-quality welding. Hence the squeezing detection sensitivity (the setting for the squeezing detection reference value Vtn) must be made appropriate for various welding conditions. Welding conditions include the material of the object for welding, joints, welding attitude, wire protrusion length, feed rate, welding rate, and numerous other parameters. In order to set the squeezing detection reference value Vtn appropriately for each of these welding conditions, in the prior art, a method is used in which the squeezing detection period Tn or current at arc re-striking Ia is used in feedback control to automatically adjust the squeezing detection reference value Vtn so as to attain a target value, as shown in FIG. 7. Further, in some cases a knob for adjusting the squeezing detection reference value Vtn is provided on the panel of the welding power supply. (As examples of the prior art see Japanese Patent Laid-open No. 2004-114088 and Japanese Patent Laid-open No. 2006-281219.)

In the above-described squeezing detection control method for consumable electrode arc welding of the prior art, the absolute value of the AC welding voltage Vw is detected and is used in constant-voltage control and squeezing detection control in the welding power supply. This is because using the DC signal facilitates the processing in the control circuit. Hence in a method of squeezing detection control for consumable electrode arc welding also, normally the squeezing detection reference value Vtn is set to one value for each set of welding conditions. For this reason, the squeezing detection reference value Vtn has been set to the same value during both electrode positive polarity periods Tep and during electrode negative polarity periods Ten.

However, the state of droplet formation and state of squeezing occurrence differ greatly for electrode positive polarity EP and for electrode negative polarity EN. As a result, if the squeezing detection reference value Vtn, which is the squeezing detection sensitivity, is set appropriately for electrode positive polarity EP, then a state ensues which is inappropriate for electrode negative polarity EN, and similarly for the reverse case. Moreover, even when the above-described method for appropriate selection of a squeezing detection reference value Vtn is used, the value is made appropriate to each set of welding conditions, but is not made appropriate to each polarity. For this reason, in consumable electrode arc welding, there are cases in which the effect in reducing the occurrence of sputtering is insufficient.

SUMMARY OF THE INVENTION

Hence an object of this invention is to provide a squeezing detection control method for consumable electrode arc welding which enables appropriate setting of the squeezing detection sensitivity in consumable electrode arc welding, so that the maximum effect in reducing the occurrence of sputtering can be realized.

According to the present invention, there is provided a squeezing detection control method for consumable electrode arc welding in which the output of the welding power supply is switched alternately between electrode positive polarity and electrode negative polarity, and moreover an arc occurrence state and a short circuiting state between the consumable electrode and the base material are repeated during each of the polarities. The squeezing detection control method of the present invention comprises: detecting a droplet squeezing phenomenon, which is a precursor phenomenon to the re-striking of arc from the short circuiting state for each of the polarities, by the fact that a change in a voltage or resistance between the consumable electrode and base material have reached a squeezing detection reference value; and executing output control such that when this squeezing phenomenon is detected, a welding current passing through a short-circuited load is rapidly decreased, thereby causing an arc to re-strike in a state of low current. The squeezing detection reference value is set to a first squeezing detection reference value during electrode positive polarity, while also being set to a second squeezing detection reference value different from the absolute value of the first squeezing detection reference value during electrode negative polarity, where the first and second squeezing detection reference values are set such that the welding states for the corresponding polarities are satisfactory.

Preferably, the absolute value of the first squeezing detection reference value may be set to a smaller value than the absolute value of the second squeezing detection reference value.

Preferably, the second squeezing detection reference value may be set by means of a function, determined in advance, which takes as input the first squeezing detection reference value.

Preferably, during periods from the time of polarity switching until a prescribed number of short circuit occurrences is reached, the absolute value of the squeezing detection reference value may be set to an intermediate value between the absolute value of the first squeezing detection reference value and the absolute value of the second squeezing detection reference value.

Preferably, the squeezing detection period, which is the period from the time of squeezing detection until the time of arc re-striking, may be divided into an electrode positive polarity period and an electrode negative polarity period. The first squeezing detection reference value may be automatically set such that the squeezing detection period during the electrode positive polarity period is equal to a first squeezing detection period setting, determined in advance. The second squeezing detection reference value may be automatically set such that the squeezing detection period during the electrode negative polarity period is equal to a second squeezing detection period setting, which is determined in advance.

According to the present invention, by setting the squeezing detection reference value to appropriate values for each polarity, squeezing detection control in consumable electrode arc welding can be stabilized. Hence in consumable electrode arc welding the occurrence of sputtering can be greatly reduced, and high-quality welding can be performed.

Further, by setting a second squeezing detection reference value using a function, determined in advance, which takes as input a first squeezing detection reference value, in addition to the above-described advantageous results, the second squeezing detection reference value can easily be set for each set of welding conditions.

Further, during the period from the time of polarity switching until a prescribed number of short circuit occurrences has been reached, by setting the absolute value of the squeezing detection reference value to the value intermediate between the absolute value of the first squeezing detection reference value and the second squeezing detection reference value, squeezing detection control can be stabilized even in transient states at the time of polarity switching. Hence the advantageous result of sputtering reduction can be further enhanced.

Further, by automatically setting the first squeezing detection reference value and second squeezing detection reference value using the squeezing detection period, appropriate values can always be set, so that the time required to set values can be greatly reduced, and moreover stable reduced-sputtering control performance can be obtained.

DETAILED DESCRIPTION OF THE PREFERRED EMBODIMENTS

The present invention will be described below with reference to the drawings.

Figure 1:
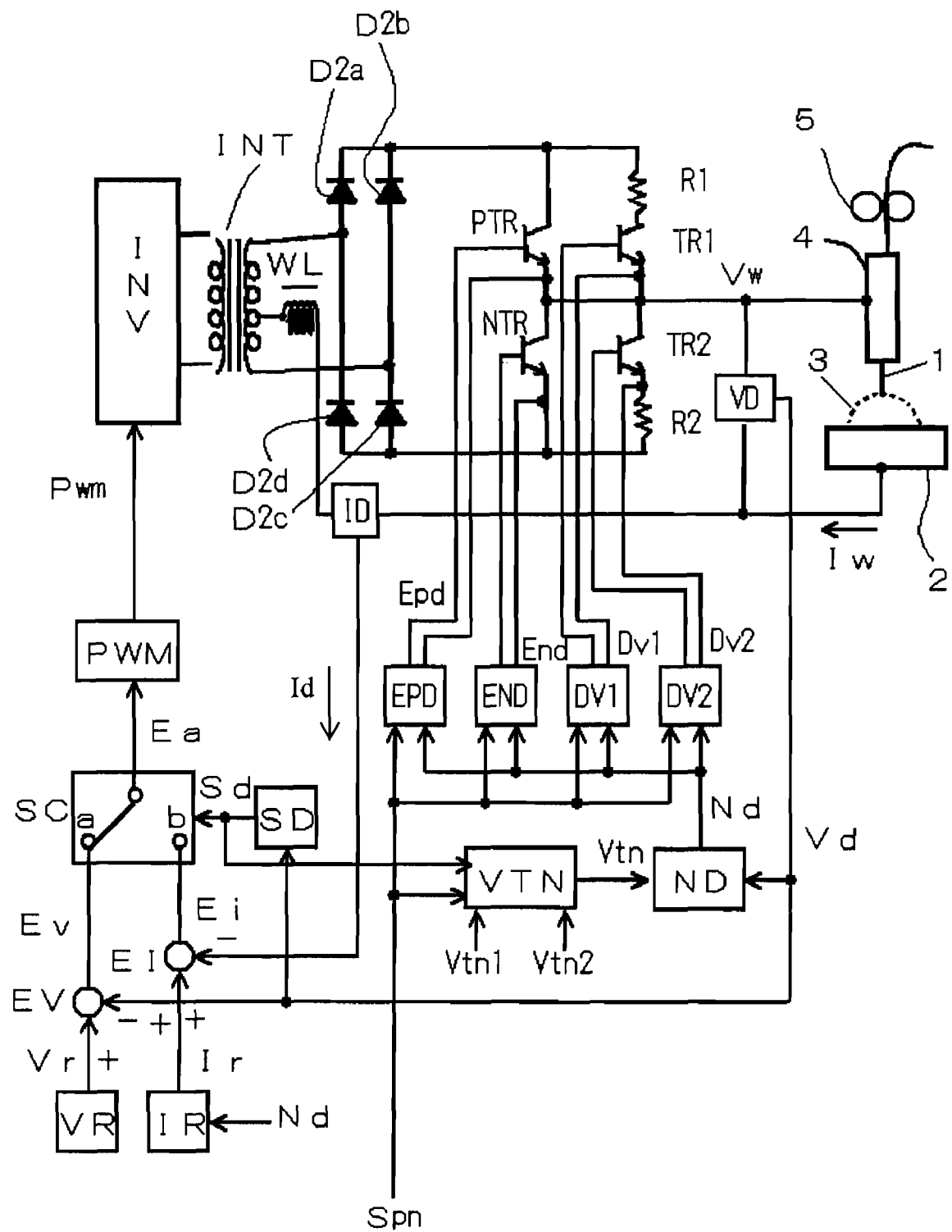
FIG. 1 is a block diagram of a welding power supply adopting a squeezing detection control method for consumable electrode arc welding of an aspect of the invention.

FIG. 1 is a block diagram of a welding power supply which adopts a squeezing detection control method for consumable electrode arc welding according to the invention.

The inverter circuit INV takes as input a commercially available three-phase 200 V power supply for example, and performs inverter control according to a pulse-width modulation signal Pwm, described below, to output a high-frequency alternating current. The high-frequency transformer INT drops the high-frequency alternating voltage to a voltage appropriate for welding. The secondary rectifiers D2a to D2d rectify the dropped high-frequency alternating current, and output positive and negative DC voltages. The reactor WL smoothes this DC voltage.

The electrode positive polarity switching element PTR and electrode negative polarity switching element NTR switch the positive and negative outputs to electrode positive polarity EP or electrode negative polarity EN. When the electrode positive polarity switching element PTR is in the conducting state, the welding power supply output is electrode positive polarity EP; when on the other hand the electrode negative polarity switching element NTR is in the conducting state, the output is electrode negative polarity EN.

A circuit in which the first switching element TR1 and first resistor R1 are connected in series is connected in parallel to the electrode positive polarity switching element PTR, and a circuit in which the second switching element TR2 and second resistor R2 are connected in series is connected in parallel with the electrode negative polarity switching element NTR.

Through rotation of a feed roller 5 of a wire feed device, the welding wire 1 is fed through the welding torch 4, arcing 3 occurs with the base material 2, and an AC welding voltage Vw and welding current Iw are supplied to the arc 3.

The voltage detection circuit VD detects the AC welding voltage Vw, converts the voltage into an absolute value, and outputs the voltage detection signal Vd. The short circuit discrimination circuit SD takes this voltage detection signal Vd as input, and outputs a short circuit discrimination signal Sd. The squeezing detection reference value setting circuit VTN takes as inputs this short circuit discrimination signal Sd and a polarity-switching signal Spn from outside, and as explained below using FIG. 2, outputs a first squeezing detection reference value Vtn1 determined in advance as the squeezing detection reference value signal Vtn when the polarity-switching signal Spn is at high level (electrode positive polarity EP), but outputs a second squeezing detection reference value Vtn2 as the squeezing detection reference value signal Vtn when Spn is at low level (electrode negative polarity EN). Further, the number of occurrences of short circuiting from the time of polarity switching is counted using the above short circuit discrimination signal Sd, and until this value reaches a prescribed number of times, a third squeezing detection reference value Vtn3 is output as the squeezing detection reference value signal Vtn. This third squeezing detection reference value Vtn3 is set to a value intermediate between the first squeezing detection reference value Vtn1 and the second squeezing detection reference value Vtn2, to for example Vtn3=(Vtn1+Vtn2)/2. The squeezing detection circuit ND detects the occurrence of droplet squeezing, which is a precursor of a transition from a state of short circuiting between the welding wire 1 and base material 2 to an arcing state, by the face that the above-described voltage increase ΔV has reached the value of this squeezing detection reference value signal Vtn, and outputs a squeezing detection signal Nd. The electrode positive polarity switching element driving circuit EPD outputs the electrode positive polarity switching element driving signal Epd, to put the electrode positive polarity switching element PTR into the conducting state, only during periods in which the polarity-switching signal Spn from outside the power supply is the setting signal corresponding to electrode positive polarity (high level), and moreover the squeezing detection signal Nd is not being output (low level period). The electrode negative polarity switching element driving circuit END outputs the electrode negative polarity switching element driving signal End, to put the electrode negative polarity switching element NTR into the conducting state, only during periods in which the polarity-switching signal Spn from outside the power supply is the setting signal corresponding to electrode negative polarity (low level), and moreover the squeezing detection signal Nd is not being output (low level period).

The first switching element driving circuit DV1 outputs a first switching element driving signal Dv1, to put the first switching element TR1 into the conducting state, only during periods in which the polarity-switching signal Spn is the setting signal corresponding to electrode positive polarity (high level), and moreover the squeezing detection signal Nd is being output (high level period). The second switching element driving circuit DV2 outputs a second switching element driving signal Dv2, to put the second switching element TR2 into the conducting state, only during periods in which the polarity-switching signal Spn is the setting signal corresponding to electrode negative polarity (low level), and moreover the squeezing detection signal Nd is being output (high level period).

Hence when the polarity-switching signal Spn is at high level (electrode positive polarity), the electrode positive polarity switching element PTR is in the conducting state, and the welding current Iw conducts via the path PTR→welding wire 1→base material 2→reactor WL. In this state, when a squeezing detection signal Nd is output (high level), the operation of the inverter circuit INV is halted, and the electrode positive polarity switching element PTR is put into the off state, while on the other hand the first switching element TR1 is put into the conducting state. By this means, energy accumulated in the reactor WL is discharged via the path R1→TR1→welding wire 1→base material 2→reactor WL. The speed of this discharge is substantially proportional to the value of (L/R), where L (H) is the inductance of the reactor WL and the resistance R (Ω) is the resistance of the first resistor R1. Normally, when no first resistance R1 is inserted, the internal resistance of the power supply is approximately 0.01 to 0.05Ω; on the other hand, when a resistance value for the first resistance R1 of approximately R=0.5Ω is selected, the discharge speed (current decline rate) is approximately 10 or more times faster. When the polarity-switching signal Spn is at low level (electrode negative polarity) also, the current is decreased rapidly, similarly to the above case.

The current detection circuit ID detects the AC welding current Iw, converts this current into an absolute value, and outputs a current detection signal Id. The voltage setting circuit VR outputs a voltage setting signal Vr with a desired value. The current setting circuit IR takes as input the squeezing detection signal Nd, and outputs a current setting signal Ir, used to set the welding current Iw over short circuit periods. At this time, the current setting signal Ir is a low current value of several tens of Amperes while the squeezing detection signal Nd is at high level (squeezing detection period Tn). The voltage error amplification circuit EV amplifies the error between the voltage setting signal Vr and the voltage detection signal Vd, and outputs an amplified voltage error signal Ev. The current error amplification circuit EI amplifies the error between the current setting signal Ir and the current detection signal Id, and outputs an amplified current error signal Ei. The external characteristic switching circuit SC switches to side a when the short circuit discrimination signal Sd is at low level (an arcing period) and outputs the amplified voltage error signal Ev as the amplified error signal Ea, and when at high level (short circuiting period) switches to side b and outputs the amplified current error signal Ei as the amplified error signal Ea. By this means, during arcing periods a constant-voltage characteristic is used, and during short circuiting periods a constant-current characteristic is used. The pulse-width modulation circuit PWM takes the amplified error signal Ea as input, and outputs a pulse-width modulation signal Pwm for use in pulse width modulation control of the inverter circuit INV.

Figure 2:
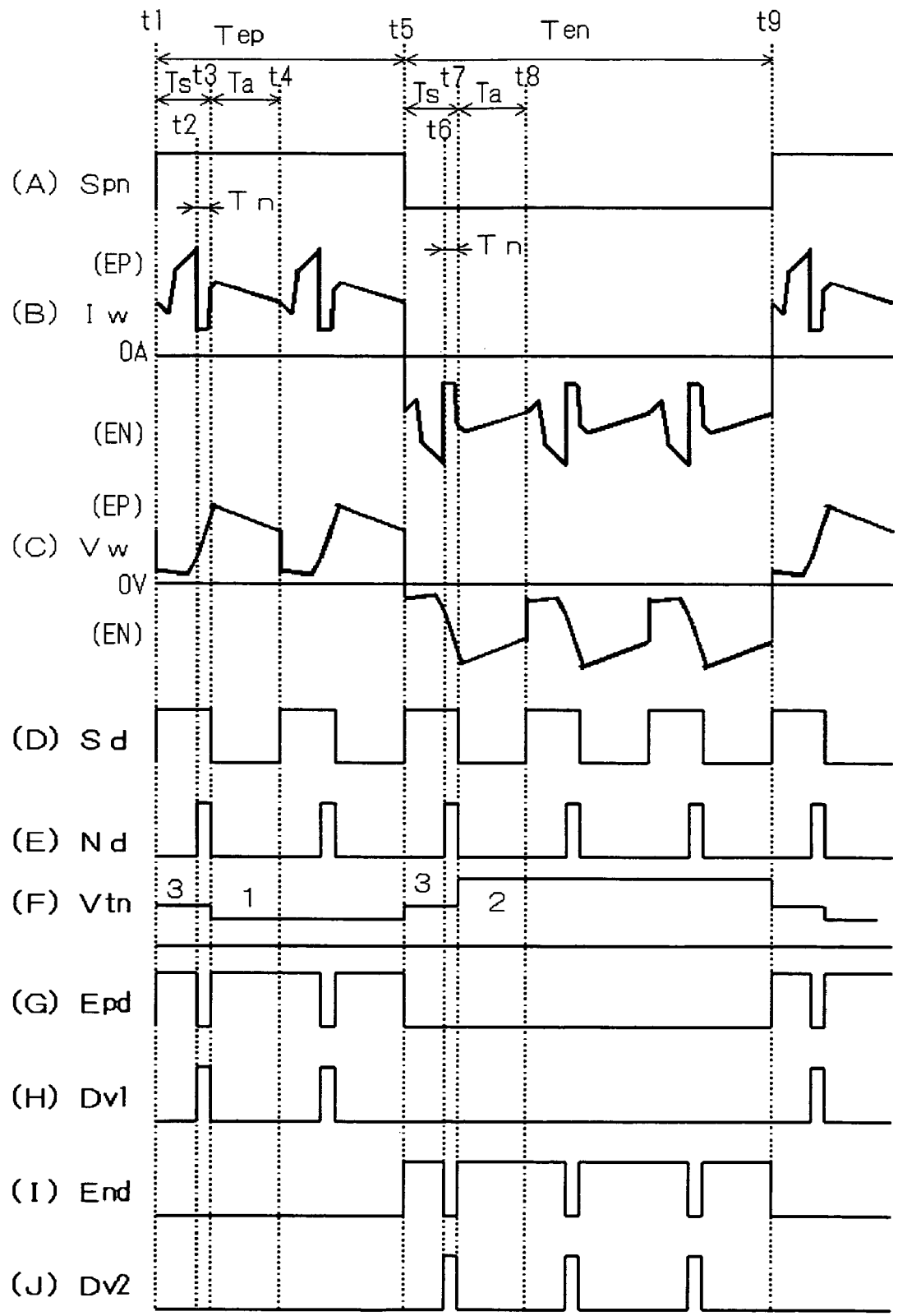
FIG. 2 is a timing chart of the various signals in FIG. 1.

FIG. 2 is a timing chart of the various signals in the above-described welding power supply apparatus of FIG. 1. In the figure, (A) is the polarity-switching signal Spn, (B) is the welding current Iw, (C) is the welding voltage Vw, (D) is the short circuit discrimination signal Sd, (E) is the squeezing detection signal Nd, (F) is the squeezing detection reference value signal Vtn, (G) is the electrode positive polarity switching element driving signal Epd, (H) is the first switching element driving signal Dv1, (I) is the electrode negative polarity switching element driving signal End, and (J) is the second switching element driving signal Dv2. The numbers 1 to 3 in (F) in the figure are abbreviations indicating the first squeezing detection reference value Vtn1, second squeezing detection reference value Vtn2, and third squeezing detection reference value Vtn3. Here, the value of the third squeezing detection reference value Vtn3 is a value intermediate between the first squeezing detection reference value Vtn1 and the second squeezing detection reference value Vtn2, and the value of the squeezing detection reference signal Vtn in the first short circuit period Ts after the polarity has switched is this third squeezing detection reference value Vtn3. The value of the squeezing detection reference signal Vtn in the second and subsequent short circuit periods Ts is the first squeezing detection reference value Vtn1 or the second squeezing detection reference value Vtn2, corresponding to the polarity. The following explanation refers to this figure.

(1) Operation During Electrode Positive Polarity Periods Tep.

As shown in (A) in the figure, when at time t1 the polarity-switching signal Spn changes to high level, in response the electrode positive polarity switching element driving signal Epv (high level) is output, as shown in (G), so that the electrode positive polarity switching element PTR enters the conducting state, and the welding power supply output becomes electrode positive polarity EP. At this time, as shown in (H) in the figure, the first switching element driving signal Dv1 is at low level, so that the first switching element TR1 is in the off state. And as shown in (D) in the figure, the first short circuit discrimination signal Sd after polarity switching is at high level, so that as shown in (F), the value of the squeezing detection reference value signal Vtn is the above-described third squeezing detection reference value Vtn3.

As shown in (C) in the figure, at time t2 the voltage increase ΔV of the welding voltage Vw reaches the value of the squeezing detection reference value signal Vtn (at this time, equal to the third squeezing detection reference value Vtn3), the squeezing detection signal Nd goes to high level, as shown in (E). In response, as shown in (G) in the figure, the electrode positive polarity switching element driving signal Epv goes to low level, so that the electrode positive polarity switching element PTR enters the off state. At the same time, as shown in (H) in the figure, the first switching element driving signal Dv1 (high level) is output, so that the first switching element TR1 enters the conducting state. Consequently, as explained above referring to FIG. 1, the first resistor R1 is inserted into the conduction path of the electrode positive polarity current, so that the electrode positive polarity current declines rapidly and becomes a small current. In this state, at time t3 an arc re-strikes, so that the occurrence of sputtering is reduced.

When at time t3 an arc re-strikes, the short circuit discrimination signal Sd goes to low level (arcing period Ta), as shown in (D) in the figure. In response, as shown in (G) in the figure, the electrode positive polarity switching element driving signal Epd (high level) is output, so that the electrode positive polarity switching element PTR enters the conducting state. At the same time, as shown in (H) in the figure, the first switching element driving signal Dv1 goes to low level, so that the first switching element TR1 enters the off state. As shown in (B) in the figure, when an arc re-strikes the welding current Iw rises rapidly, and thereafter declines gently. Also, at time t3 the first short circuiting ends, so that as shown in (F), the value of the squeezing detection reference value signal Vtn becomes the above first squeezing detection reference value Vtn1, and this value is maintained until the electrode positive polarity period Tep ends at time t5. During the above short circuiting period Ts (times t1 to t3), the welding power supply is under constant-current control, so that the current is set by the current setting signal Ir explained above using FIG. 1. Then, during the squeezing detection period Tn between times t2 and t3, this value of the current setting signal Ir becomes low, so that the welding current value Iw also becomes a low value. On the other hand, during the arcing period Ta (times t3 to t4), the welding power supply is under constant-voltage control.

During the period between times t4 and t5, the above operation is repeated. However, as indicated in (F) in the figure, the value of the squeezing detection reference value signal Vtn during this period is the first squeezing detection reference value Vtn1.

(2) Operation During Electrode Negative Polarity Periods Ten.

As shown in (A) in the figure, at time t5 the polarity-switching signal Spn changes to low level, and as shown in (G), the electrode positive polarity switching element driving signal Epv goes to low level, so that the electrode positive polarity switching element PTR enters the off state, and as shown in (I), the electrode negative polarity switching element driving signal End (high level) is output, so that the electrode negative polarity switching element NTR is in the conducting state, and the output of the welding power supply switches to electrode negative polarity EN. Then, as shown in (F), the squeezing detection reference signal Vtn for the first short circuit period Ts (times t5 to t7) is the above-described third squeezing detection reference value Vtn3. As shown in (C) in the figure, at time t6 the increase ΔV in the welding voltage Vw reaches the third squeezing detection reference value Vtn3, upon which, as shown in (F), the squeezing detection signal Nd goes to high level. In response, as shown in (I) in the figure, the electrode negative polarity switching element driving signal End goes to low level, so that the electrode negative polarity switching element NTR enters the off state. At the same time, as shown in (J) in the figure, the second switching element driving signal Dv2 (high level) is output, so that the second switching element TR2 enters the conducting state. Hence the second resistor R2 is inserted into the conduction path of the electrode negative polarity current, so that the current falls rapidly to a low value. In this state, when an arc re-strikes at time t7, the short circuit discrimination signal Sd goes to low level, as shown in (D). In response, as shown in (I), the electrode negative polarity switching element driving signal End is output, so that the electrode negative polarity switching element NTR enters the conducting state. At the same time, as shown in (J), the second switching element driving signal Dv2 goes to low level, so that the second switching element TR2 enters the off state.

At time t7, the first short circuiting period Ts ends. As shown in (F) in the figure, the value of the squeezing detection reference value signal Vtn becomes the above-described second squeezing detection reference value Vtn2, and this is maintained throughout the electrode negative polarity period Ten up to time t9. Hence the value of the squeezing detection reference value signal Vtn in the second and subsequent short circuit periods Ts becomes the above-described second squeezing detection reference value Vtn2. Operation in the period between times t8 and t9 is the same as the operation in the period between times t5 and t8.

Figure 3:
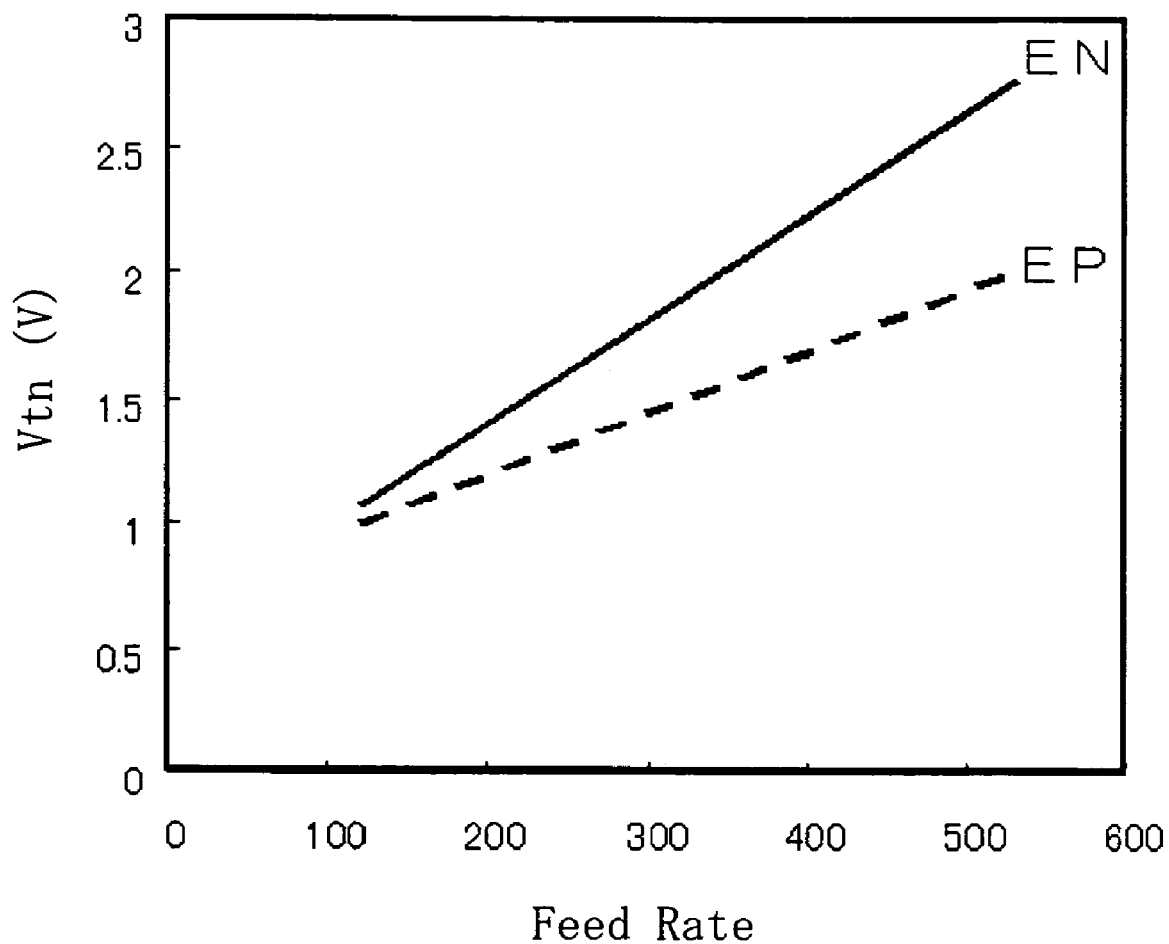
FIG. 3 is a figure showing appropriate values for squeezing detection reference values for electrode positive polarity EP and electrode negative polarity EN.

FIG. 3 shows examples of appropriate values for the squeezing detection reference value Vtn for each of the polarities EP and EN. In the figure, the horizontal axis indicates the feed rate (cm/min), and the vertical axis shows the appropriate values (V) for the squeezing detection reference value Vtn. The figure gives appropriate values for the squeezing detection reference value Vtn for each polarity when the feed rate is varied, using a welding wire of iron material.

As is clear from the figure, under the same welding conditions, the appropriate value for the squeezing detection reference value Vtn is smaller for electrode positive polarity EP than for electrode negative polarity EN. The smaller the squeezing detection reference value Vtn, the higher is the detection sensitivity. Hence the sensitivity of squeezing detection is set to be higher for electrode positive polarity EP. The reason for this is that, if the feed rate is the same, then the average current is larger for electrode negative polarity EN, and so the droplet size is also larger. Further, the stability of droplet transfer for electrode negative polarity EN is poor compared with that for electrode positive polarity EP. From these factors, it is better to set the detection sensitivity to be lower for electrode negative polarity EN.

As explained above, the squeezing formation state is different for electrode positive polarity EP and for electrode negative polarity EN, and so the squeezing detection reference value Vtn must be set to different values appropriate to the respective polarities. At this time, the squeezing detection reference value Vtn is set lower (lower sensitivity) for electrode positive polarity EP. Further, when short circuiting occurs less than a prescribed number of times after polarity switching, the squeezing detection reference value Vtn is set to a value intermediate between the squeezing detection reference value for electrode positive polarity EP and the squeezing detection reference value for electrode negative polarity EN. This is because, for a prescribed number of short circuits from the time of polarity switching, the squeezing formation state is a transient state. That is, up until a prescribed number of short circuits from the time of switching from electrode positive polarity EP to electrode negative polarity EN, the squeezing formation state changes in a transient manner from the formation state for electrode positive polarity EP to the formation-state for electrode negative polarity EN.

In the above-described aspect, a case was explained in which the third squeezing detection reference value Vtn3 is used only for the first short circuit period after polarity switching; but the value may be used during a prescribed number of short circuit periods, from one to over a dozen. Further, in the above-described FIG. 3, the second squeezing detection reference value Vtn2 may be set automatically by means of a function, determined in advance, which takes as input the first squeezing detection reference value Vtn1. Also, the squeezing detection reference values Vtn1 and Vtn2 may be adjusted automatically such that, for each polarity, the squeezing detection period Tn or the current at arc re-striking Ia is a target value. And, when switching from electrode positive polarity EP to electrode negative polarity EN, and when switching back from electrode negative polarity EN to electrode positive polarity EP, the third squeezing detection reference values Vtn3 may be set to different values. Also, in place of a prescribed number of short circuits after polarity switching, a prescribed period may be used. In this aspect, a case of short circuiting transfer welding was used as an example of consumable electrode arc welding; but application to globular transfer welding accompanied by short circuiting, pulse arc welding accompanied by short circuiting, spray transfer welding accompanied by short circuiting, and similar is also possible.

Figure 4:
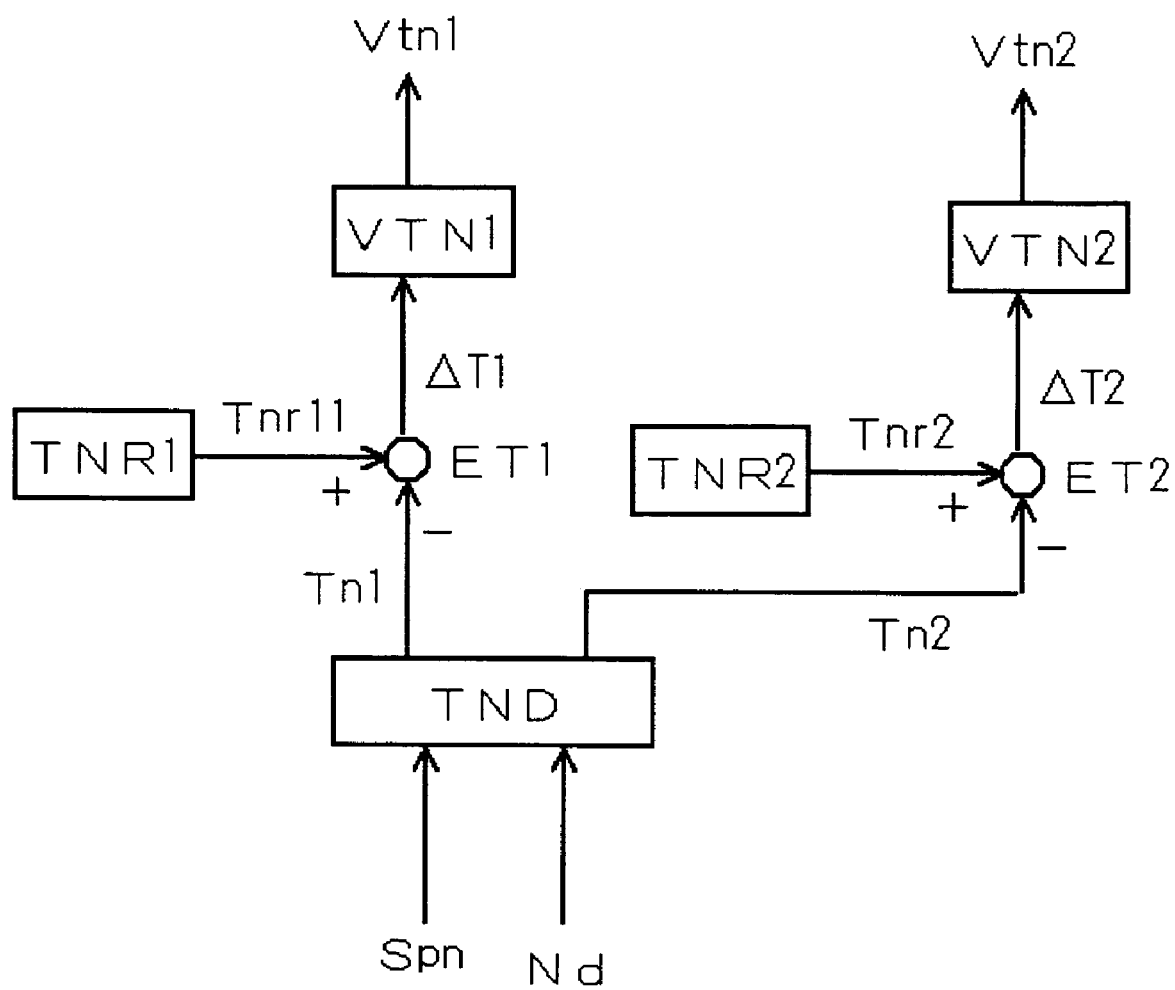
FIG. 4 is a block diagram of a circuit added to FIG. 1, in order to automatically set the first squeezing detection reference value Vtn1 and second squeezing detection reference value Vtn2 in an aspect of the invention.
Figure 5:
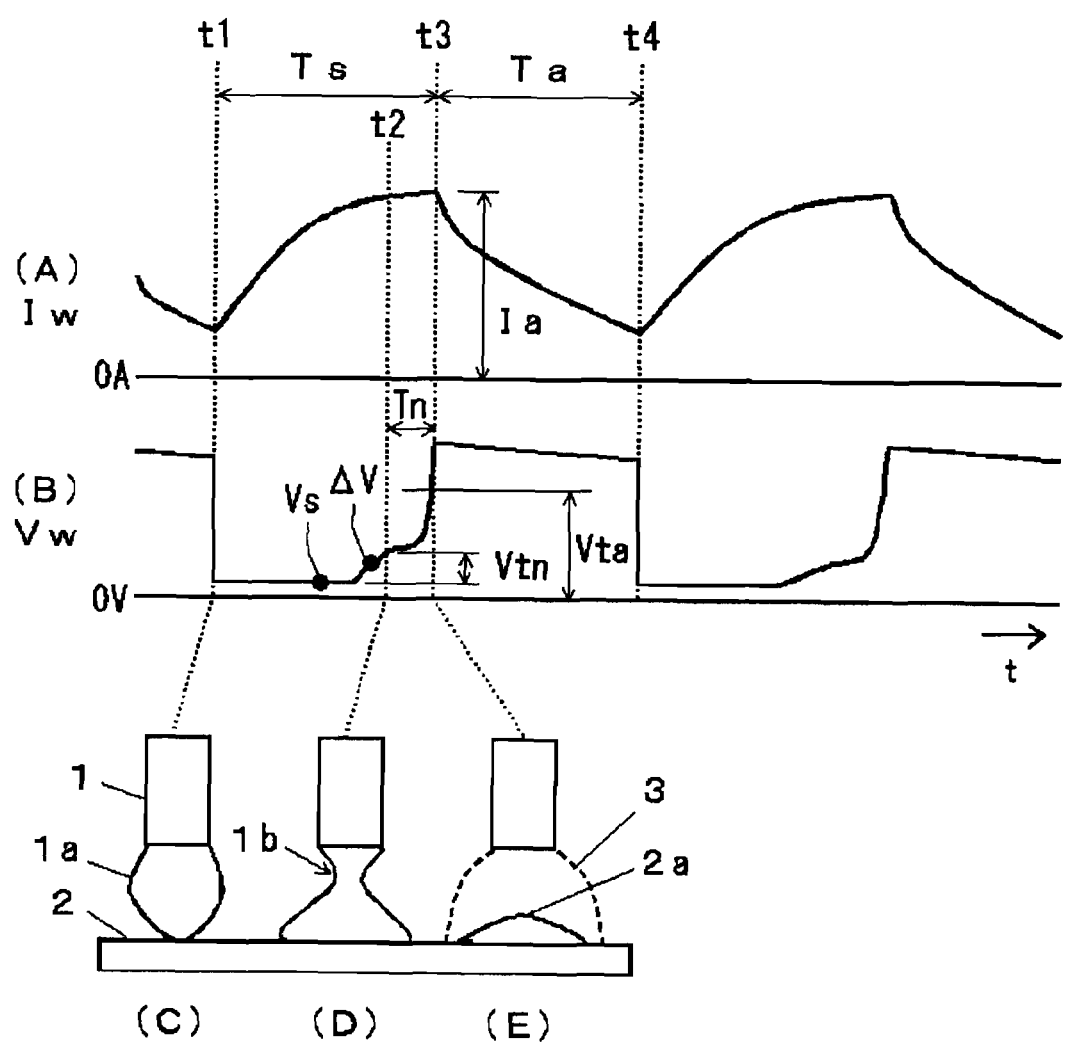
FIG. 5 shows the current and voltage waveforms and droplet transfer state for consumable electrode arc welding of the prior art.
Figure 6:
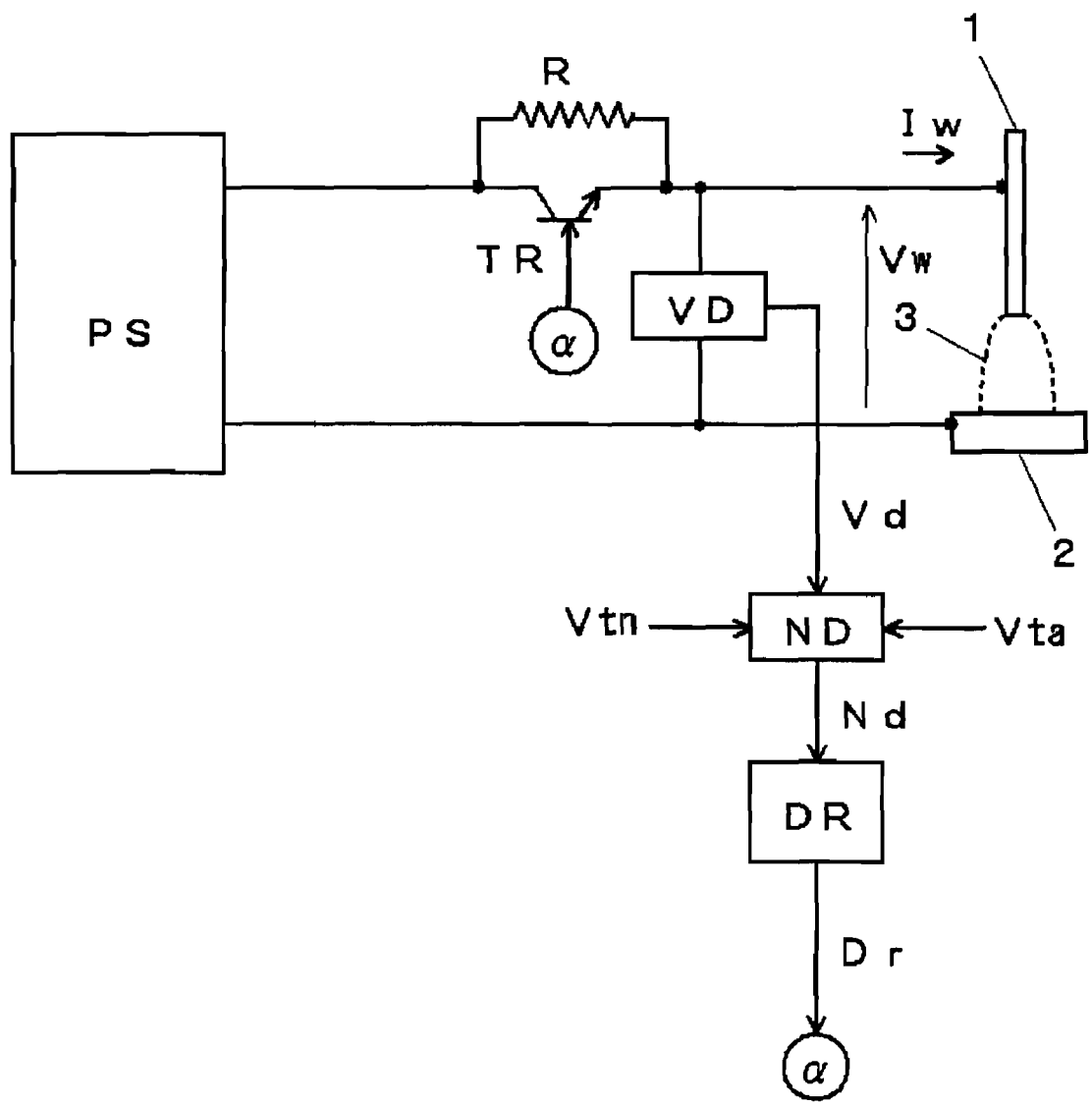
FIG. 6 is a block diagram of a welding power supply adopting squeezing detection control in the prior art.
Figure 7:
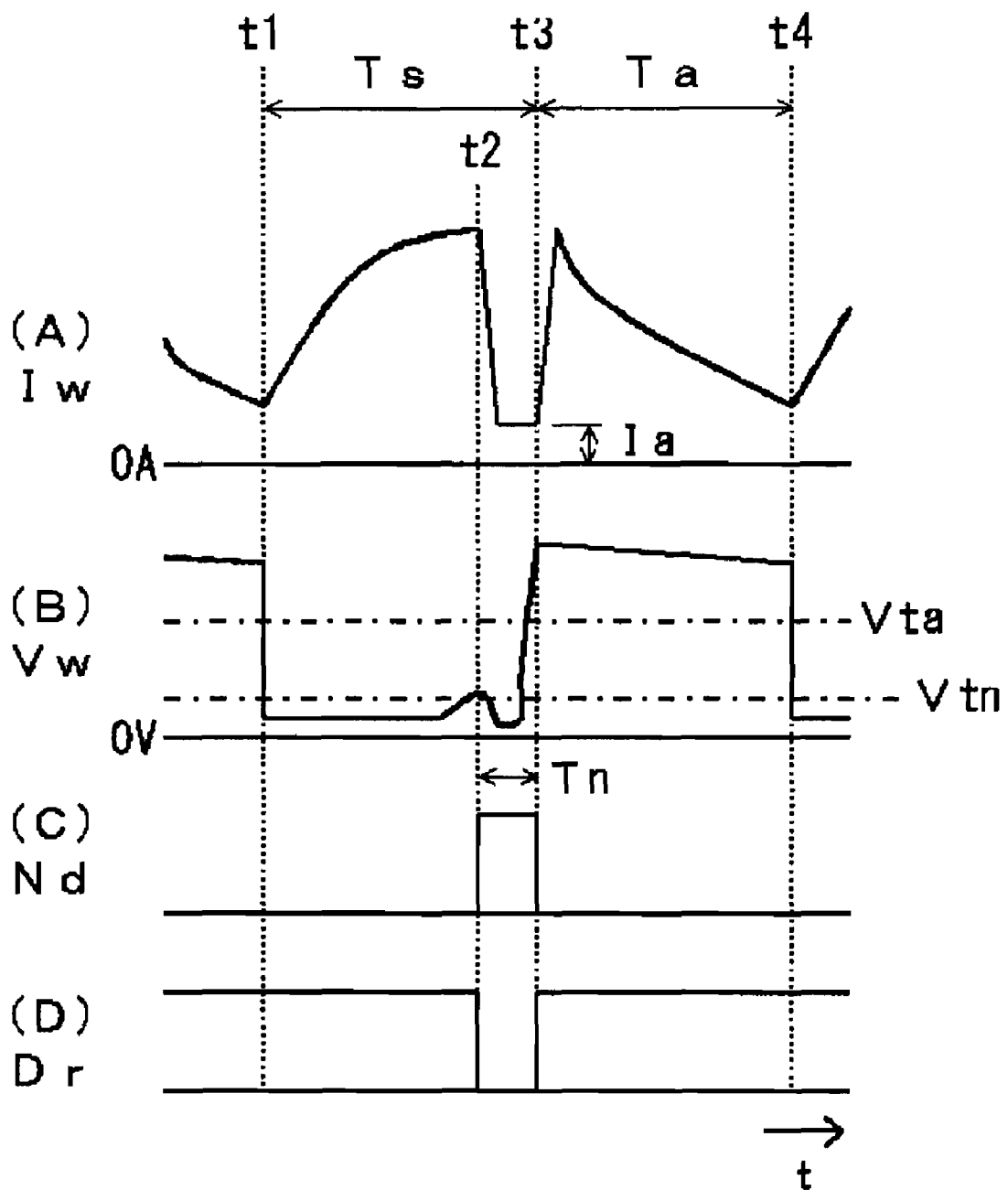
FIG. 7 is a timing chart of the various signals in FIG. 6.
Figure 8:
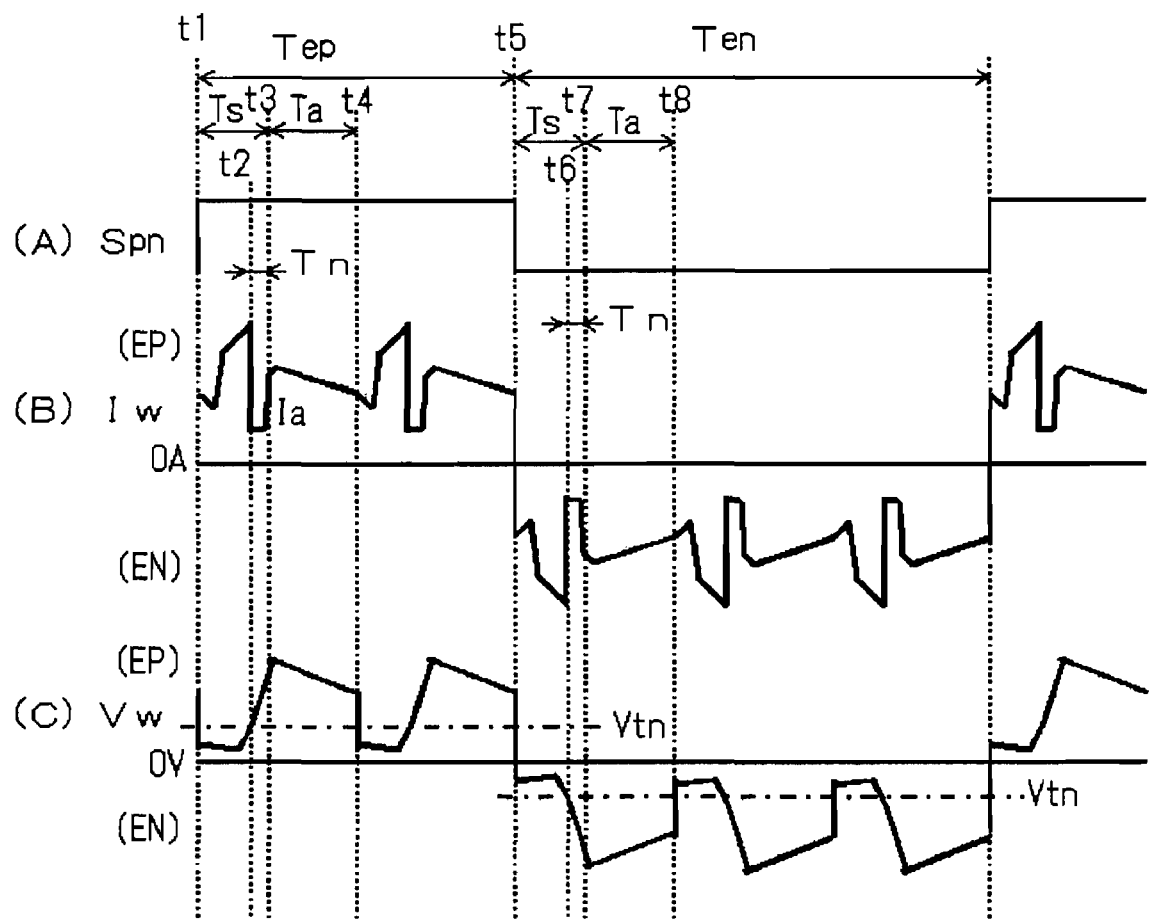
FIG. 8 is a current and voltage waveform diagram showing a squeezing detection control method for consumable electrode arc welding of the prior art.

Below, a case is explained in which the squeezing detection period Tn is used to automatically set the first squeezing detection reference value Vtn1 and the second squeezing detection reference value Vtn2. FIG. 4 is a block diagram of a circuit provided to add these automatic setting functions to the welding power supply explained above using FIG. 1. The figure shows a circuit added to perform automatic setting of the first squeezing detection reference value Vtn1 and second squeezing detection reference value Vtn2 shown in FIG. 1.

The circuit shown in the figure takes as inputs the polarity-switching signal Spn and squeezing detection signal Nd described above using FIG. 1, and outputs a first squeezing detection reference value signal Vtn1 and a second squeezing detection reference value signal Vtn2. The squeezing detection period detection circuit TND takes as input the above-described polarity-switching signal Spn and squeezing detection signal Nd, computes the moving average of the time duration of the squeezing detection period for electrode positive polarity EP, and outputs the result as the first squeezing detection period signal Tn1, and moreover computes the moving average of the time duration of the squeezing detection period for electrode negative polarity EN, and outputs the result as the second squeezing detection period signal Tn2. Here, the squeezing detection signal Nd is a signal which is at high level during the squeezing detection period, and so by measuring the period in which this signal is at high level, the squeezing detection period can be detected.

The first squeezing detection period setting circuit TNR1 outputs a first squeezing detection period setting signal Tnr1, determined in advance. The first period error amplification circuit ET1 amplifies the error between the above-described first squeezing detection period setting signal Tnr1 and the first squeezing detection period signal Tn1, and outputs a first amplified period error signal ΔT1. The first squeezing detection reference value setting circuit VTN1 differentiates this first amplified period error signal ΔT1, and outputs a first squeezing detection reference value signal Vtn1.

The second squeezing detection period setting circuit TNR2 outputs a second squeezing detection period setting signal Tnr2, determined in advance. The second period error amplification circuit ET2 amplifies the error between the above-described second squeezing detection period setting signal Tnr2 and the second squeezing detection period signal Tn2, and outputs a second amplified period error signal ΔT2. The second squeezing detection reference value setting circuit VTN2 differentiates this second amplified period error signal ΔT2, and outputs a second squeezing detection reference value signal Vtn2.

In the above, when the squeezing detection reference value is set to an appropriate value, the squeezing detection period also substantially converges on a prescribed value. The convergence value of the squeezing detection period differs with the polarity. For electrode positive polarity EP, a target value for the squeezing detection period (a first squeezing detection period setting signal Tnr1) is set, and the first squeezing detection reference value signal Vtn1 is set automatically such that the squeezing detection period for electrode positive polarity EP (first squeezing detection period signal Tn1) is equal to this target value. Similarly, a squeezing detection period target value (second squeezing detection period setting signal Tnr2) for electrode negative polarity EN is set, and the second squeezing detection reference value signal Vtn2 is set automatically such that the squeezing detection period for electrode negative polarity EN (second squeezing detection period signal Tn2) is equal to this target value.

According to the above-described aspect, by setting squeezing detection reference values which are appropriate for each of the polarities, squeezing detection control in consumable electrode arc welding can be stabilized. As a result, the amount of sputtering in consumable electrode arc welding can be greatly reduced, and high-quality welding can be performed.

Further, by setting the second squeezing detection reference value using a function, determined in advance, which takes the first squeezing detection reference value as input, in addition to the above advantageous results, the second squeezing detection reference value can easily be set for different welding conditions.

Further, by setting the absolute value of the squeezing detection reference value to a value intermediate between the absolute value of the first squeezing detection reference value and the absolute value of the second squeezing detection reference value during the period from the time of polarity switching until a prescribed number of short circuit occurrences is reached, squeezing detection control can be stabilized even in transient states at the time of polarity switching. As a result, the advantageous result of sputtering reduction can be further enhanced.

Further, by automatically setting the first squeezing detection reference value and second squeezing detection reference value using the squeezing detection period, setting to an appropriate value is always possible, so that the time required to set values can be greatly reduced, and moreover stable reduced-sputtering control performance can be obtained.

The invention claimed is:

1. A squeezing detection control method for consumable electrode arc welding in which an output of a welding power supply is switched alternately between electrode positive polarity and electrode negative polarity, and moreover an arc occurrence state and a short circuiting state between a consumable electrode and a base material are repeated during each of the polarities, the squeezing detection control method comprising:

detecting a droplet squeezing phenomenon for each of the polarities when a change in a voltage or resistance between the consumable electrode and base material reaches a squeezing detection reference value; and executing output control for rapidly decreasing a welding current passing through a short-circuited load when the droplet squeezing phenomenon is detected, so that arc re-striking occurs in a state of low current;

wherein the squeezing detection reference value is set to a first squeezing detection reference value during the electrode positive polarity, the squeezing detection reference value being set to a second squeezing detection reference value during the electrode negative polarity, the second squeezing detection reference value being different from an absolute value of the first squeezing detection reference value, each of the first and the second squeezing detection reference values being set such that a welding state for corresponding one of the polarities is satisfactory, wherein during an interval from a polarity switching time until a prescribed number of short circuit occurrences is reached, an absolute value of the squeezing detection reference value is set to an intermediate value between the absolute value of the first squeezing detection reference value and the absolute value of the second squeezing detection reference value.

2. The squeezing detection control method according to claim 1, wherein the absolute value of the first squeezing detection reference value is set to a smaller value than an absolute value of the second squeezing detection reference value.

3. The squeezing detection control method according to claim 1, wherein the second squeezing detection reference value is set by a predetermined function that takes as input the first squeezing detection reference value.

4. The squeezing detection control method according to claim 1, further comprising detecting a squeezing detection period lasting from squeezing detection until arc re-striking, the detecting of the squeezing detection period being performed for an electrode positive polarity period and an electrode negative polarity period, wherein the first squeezing detection reference value is automatically set such that the squeezing detection period of the electrode positive polarity period is equal to a predetermined first squeezing detection period setting, and wherein the second squeezing detection reference value is automatically set such that the squeezing detection period of the electrode negative polarity period is equal to a predetermined second squeezing detection period setting.

* * * * *